US010389433B2

(12) United States Patent
Jones et al.

(10) Patent No.: US 10,389,433 B2
(45) Date of Patent: Aug. 20, 2019

(54) METHOD OF SEAMLESS PROTECTION SWITCHING OF PACKETS AT THE SATELLITE, FROM TWO MATCHING STEAMS OF PACKETS FROM TWO SEPARATE UPLINK SITES

(71) Applicant: INTELSAT CORPORATION, McLean, VA (US)

(72) Inventors: John Scott Jones, Peachtree City, GA (US); Sunil Gottipati, Cumming, GA (US)

(73) Assignee: INTELSAT CORPORATION, McLean, VA (US)

( * ) Notice: Subject to any disclaimer, the term of this patent is extended or adjusted under 35 U.S.C. 154(b) by 233 days.

(21) Appl. No.: 15/534,657

(22) PCT Filed: Dec. 10, 2015

(86) PCT No.: PCT/US2015/065013
§ 371 (c)(1),
(2) Date: Jun. 9, 2017

(87) PCT Pub. No.: WO2016/094667
PCT Pub. Date: Jun. 16, 2016

(65) Prior Publication Data
US 2018/0269960 A1    Sep. 20, 2018

Related U.S. Application Data

(60) Provisional application No. 62/090,156, filed on Dec. 10, 2014.

(51) Int. Cl.
*H03M 13/00* (2006.01)
*H04B 7/185* (2006.01)
(Continued)

(52) U.S. Cl.
CPC ....... *H04B 7/18582* (2013.01); *H04B 7/1858* (2013.01); *H04L 1/0041* (2013.01);
(Continued)

(58) Field of Classification Search
CPC . H04B 7/18582; H04B 7/1858; H04L 1/0041; H04L 1/0045; H04L 43/0835
See application file for complete search history.

(56) References Cited

U.S. PATENT DOCUMENTS 7,509,144 B2 *    3/2009   Bettinger ............... G06Q 30/04
                                                 370/316
7,551,736 B2 *    6/2009   Lee ...................... H04B 7/1858
                                                 375/254

(Continued)

OTHER PUBLICATIONS

International Search Report of PCT/US2015/065013, dated Feb. 3, 2016. [PCT/ISA/210].

(Continued)

*Primary Examiner* — Esaw T Abraham
(74) *Attorney, Agent, or Firm* — Sughrue Mion, PLLC (57) ABSTRACT

A telecommunications satellite including a receiver that receives a first stream of data packets transmitted by a first transmission site and a second stream of data packets transmitted by a second transmission site, a stream analyzer that aligns the data packets in the first stream and the data packets in the second stream, analyzes corresponding data packets in the first stream and the second stream to identify missing or corrupted data packets, and selects data packets to place into forward transmission based upon the analysis, and a transmitter that transmits the selected data packets to at least one receive site.

20 Claims, 6 Drawing Sheets

(51) Int. Cl.
*H04L 1/00* (2006.01)
*H04L 12/26* (2006.01)
*H04L 12/939* (2013.01)

(52) U.S. Cl.
CPC ........ *H04L 1/0045* (2013.01); *H04L 43/0835* (2013.01); *H04L 43/0847* (2013.01); *H04L 49/552* (2013.01)

(56) References Cited

U.S. PATENT DOCUMENTS

| | | | | |
|---|---|---|---|---|
| 7,684,426 B2* | 3/2010 | Narvaez | ............... | H04J 3/062 370/419 |
| 7,843,850 B2* | 11/2010 | Isambart | ............... | H04N 17/004 370/252 |
| 8,116,255 B2* | 2/2012 | Rigal | ............... | H04H 20/74 370/321 |
| 8,213,553 B2* | 7/2012 | Zhou | ............... | H04B 7/1858 375/148 |
| 8,364,833 B2* | 1/2013 | Bennett | ............... | H04L 63/0245 709/230 |
| 9,077,667 B2* | 7/2015 | Sridhar | ............... | H04L 45/74 |
| 9,282,113 B2* | 3/2016 | Vaughan | ............... | H04L 63/1441 |
| 9,444,683 B2* | 9/2016 | Kakadia | ............... | H04L 41/0823 |
| 9,578,543 B2* | 2/2017 | Cho | ............... | H04W 28/06 |
| 2002/0093963 A1 | 7/2002 | Roullet et al. | | |
| 2003/0185201 A1* | 10/2003 | Dorgan | ............... | H04J 3/14 370/352 |
| 2006/0034375 A1 | 2/2006 | Ward | | |
| 2008/0252514 A1 | 10/2008 | Rigal et al. | | |
| 2009/0168804 A1 | 7/2009 | Crookes et al. | | |
| 2009/0168812 A1 | 7/2009 | Crookes et al. | | |
| 2013/0303080 A1 | 11/2013 | Moreno | | |
| 2014/0229997 A1 | 8/2014 | Kim et al. | | |
| 2014/0280752 A1 | 9/2014 | Seastrom et al. | | |
| 2015/0229970 A1* | 8/2015 | Ma | ............... | H04L 47/20 370/260 |

OTHER PUBLICATIONS

Written Opinion of PCT/US2015/065013, dated Feb. 3, 2016. [PCT/ISA/237].

\* cited by examiner

METHOD OF SEAMLESS PROTECTION SWITCHING OF PACKETS AT THE SATELLITE, FROM TWO MATCHING STEAMS OF PACKETS FROM TWO SEPARATE UPLINK SITES

CROSS-REFERENCE TO RELATED APPLICATION

This application claims priority to and the benefit of U.S. Provisional Patent Application No. 62/090,156, filed on Dec. 10, 2014, the disclosure of which is incorporated by reference herein in its entirety.

BACKGROUND

Field

The present disclosure relates generally to space-based communication architecture and more specifically to providing redundancy and automatic failover capability to the uplink signals to a satellite.

Description of the Related Art

Typical space-based communication architecture relies on a ground station/Earth station uplinking a carrier to a particular spacecraft/satellite and a receive antenna on the satellite receiving the signal and then re-transmitting the signal using a transmit antenna. One or more receive sites (e.g., spacecraft or satellites) tune to the particular carrier frequency transmitted by the satellite to receive the signal.

Satellite or space-based communication is a natural medium for point to multi-point and unidirectional distribution of content. Satellite or space based communication may be used for this type of content, rather than fiber or other terrestrial facilities, in order to reduce terrestrial network congestion. However, satellite transmission is limited in its methods of correcting for any lost or damaged packets.

Forward error correction (FEC) is typically the sole method of improving resiliency used in satellite or space based communication. However, FEC may consume a significant amount of bandwidth on a continuous basis. FEC is also susceptible to complete outages.

An alternative method to FEC is Automatic RepeatreQuest (ARQ). With ARQ, packets are only resent when the packets are damaged or are missing. In comparison to FEC, ARQ reduces the amount of bandwidth needed, but introduces delay to allow for the correction and reassembly of the damaged stream. Also, ARQ requires a backchannel from each receive site which is neither simple nor cost effective via satellite.

In the related art, a backup uplink chain may be established at the ground station/Earth station having the primary uplink chain uplinking the carrier to the spacecraft/satellite or at a different ground station/Earth station. However, the switchover from the primary uplink chain to the backup uplink chain is a manual process, and the primary uplink must be disabled in order to prevent radio frequency (RF) interference.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

A mechanism is provided by which a satellite receives identical copies of a signal stream from two transmission locations, according to an embodiment. The satellite has the capability of receiving two streams. The packets of each stream are aligned using packet header information. The satellite performs a reference stamp based hitless merging technique at the satellite to create a lossless/seamless output stream.

According to an embodiment, the streams of packets are unidirectional. The streams of packets are received at the satellite from ground transmission stations or other Earth-based transmission stations or from another satellite/spacecraft and then retransmitted by the satellite to ground receive stations or other Earth-based receive stations. The system may provide high quality delivery of the unidirectional packet stream. This type of content may be either linear or file-based and is generally transmitted as a pushed content (e.g., a live broadcast of a special event or sporting event or in the case of file-based content, a software update or security patch).

The satellite receiving the streams of packets has the capability to analyze, compare, and align each packet and determine, based on the condition of the packets, which packet is suitable to be placed into the output stream for distribution to be transmitted towards to the receive sites, according to an embodiment.

Redundancy and automatic failover capability is provided for the uplink signals to a satellite, eliminating the need for manual disaster recovery uplinks and manual switching procedures for operations, according to an embodiment.

The system and method of seamless protection switching of packets at the satellite according to an embodiment includes at least two physically diverse uplink/transmit facilities that uplink/transmit identical streams of packets in which corresponding packets have identical packet headers and/or timestamp metadata.

According to an embodiment, the telecommunications spacecraft receives a first packet from a first uplink and forwards the received packet to an onboard analyzer that is provided on the telecommunications spacecraft. The onboard analyzer inspects the received first packet for errors based on the checksum and/or cyclic redundancy check (CRC) information within the packet header. If errors are detected in the received first packet, the onboard analyzer logs the errors and discards the received first packet. If the received first packet is determined to be error-free, the received first packet is placed into an output stream buffer.

Next, the telecommunications spacecraft receives a second packet from a second uplink and forwards the received packet to the onboard analyzer. The onboard analyzer inspects the received second packet for errors based on the checksum and/or CRC information within the header. If errors are detected in the received second packet, the onboard analyzer logs the errors and discards the received second packet.

If the second packet is determined to be error-free, the onboard analyzer performs further analysis to determine if the header information of the received second packet matches the header information of an existing packet stored in the output stream buffer. If a matching packet is found based upon a comparison of the header information of the received second packet and the header information of existing packets stored in the output stream buffer, the onboard analyzer causes the received second packet to be discarded. On the other hand, if no matching packet is found based upon the comparison of the header information of the received second packet and the header information of existing packets stored in the output stream buffer, the onboard analyzer causes the second received packet to be placed into the output stream buffer.

According to an embodiment, the size of the output stream buffer may be determined by a user-configurable setting. Alternatively, the size of the output stream buffer may be automatically determined or may be preset.

Next, in response to determining that the output stream buffer is full, the onboard analyzer causes the received packets stored in the output stream buffer to be streamed out toward the transmit antenna of the telecommunications spacecraft using a first in first out (FIFO) algorithm.

The telecommunications spacecraft then transmits the seamless stream of packets from the output buffer using one or more transmit antennas. According to an embodiment, the transmit antenna transmits the downlink. According to an embodiment, the transmit antenna transmits the downlink on the Ku-band. Alternatively, any other band or transmission method may be used by the transmit antenna to transmit the downlink.

One or more receive sites or downlink sites then receive the seamless output stream from the satellite using the correct downlink parameters, according to an embodiment.

Figure 1:
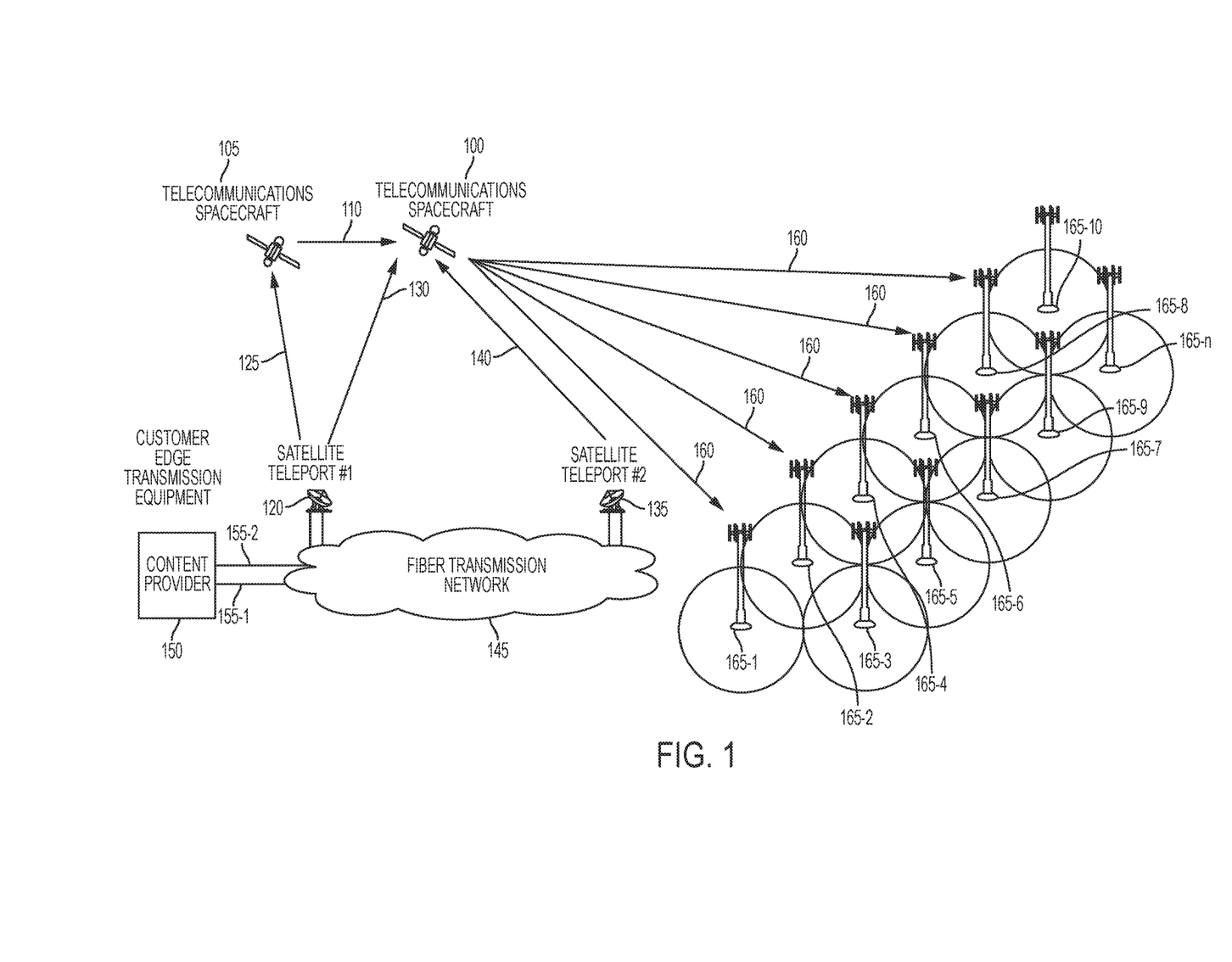
FIG. 1 is a block diagram illustrating a system providing seamless protection switching of packets at the satellite, from two matching streams of packets from two separate uplink sites, according to an embodiment.

FIG. 1 is a block diagram illustrating a system providing seamless protection switching of packets at the satellite, from two matching streams of packets from two separate uplink sites, according to an embodiment.

According to an embodiment, the system includes a telecommunications spacecraft 100. The telecommunications spacecraft 100 may be a satellite or any other type of spacecraft, including but not limited to telecommunications satellites in various earth orbits, space probes, stationary space stations, etc.

The telecommunications spacecraft 100 may include one or more receive antennas configured to receive an uplink 130, 140 from one or more uplink/transmit facilities as a first satellite teleport 120 and a second satellite teleport 135, which are examples of ground transmission stations or Earth-based transmission stations. Alternatively, instead of or in addition to receiving an uplink from the first satellite teleport 120 and the second satellite teleport 135, the telecommunications spacecraft may be configured to receive an uplink from other ground transmission stations or other Earth-based transmission stations.

The one or more receive antennas may be configured to receive uplinks 130, 140 transmitted using various transmission technologies. For example, the uplinks 130, 140 may be transmitted using radio frequency (RF) transmission, optical transmission (laser based), or any other transmission methods.

The telecommunications spacecraft 100 may also include one or more receive antennas configured to receive an uplink 110 from one or more other telecommunications spacecraft 105.

Packetized data may be received by the telecommunications spacecraft 100 over the uplinks 110, 130, 140. The uplinks 110, 130, 140 may be transmitted by geographically separated transmission sites. For example, uplink 110 may be transmitted by a telecommunications spacecraft 105 which is positioned in a geographically distinct location from the telecommunications spacecraft 100, the first satellite teleport 120, and the second satellite teleport 135. Likewise, the first satellite teleport 120 may be situated in a geographically distinct location from the second satellite teleport 135.

The telecommunications spacecraft 100 may include one or more transmit antennas configured to transmit a downlink 160 to one or more ground receive stations or other Earth-based receive stations such as cellular towers 165-1, 165-2, 165-3, 165-4, 165-5, 165-6, 165-7, 165-8, 165-9, 165-10, . . . 165-n. The one or more transmit antennas on the telecommunications spacecraft 100 may be configured to transmit the downlink. Each of the cellular towers 165-1, 165-2, 165-3, 165-4, 165-5, 165-6, 165-7, 165-8, 165-9, 165-10, . . . 165-n may include one or more small satellite receive dishes to receive the downlink transmitted by one or more telecommunications spacecraft 100.

The first satellite teleport 120 and the second satellite teleport 135 may be connected to a fiber transmission network 145 or other terrestrial communication network. The first satellite teleport 120 and the second satellite teleport 135 may communicate with at least one content provider 150 and receive content from at least one content provider 150 for transmission to telecommunications spacecraft 100 and/or telecommunications spacecraft 105 over one or more of uplinks 125, 130, 140.

The content provider 150 may be implemented as customer edge transmission equipment or in any other manner. The content provider 150 may be in communication with the fiber transmission network 145 or other terrestrial communication network via dual and diverse fiber links 155-1 and 155-2 or via any other method.

Figure 2:
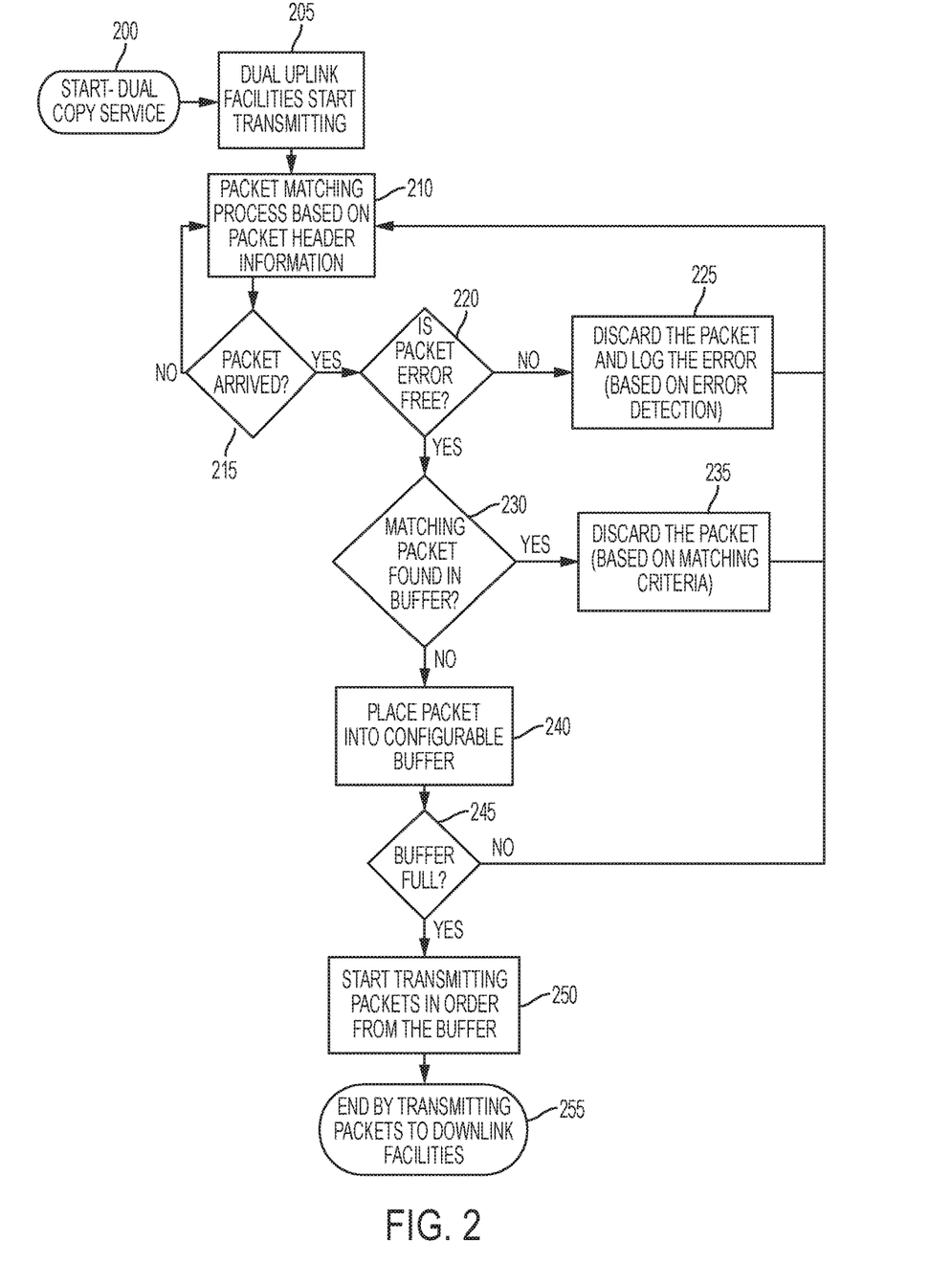
FIG. 2 is a flow diagram illustrating a process for providing seamless protection switching of packets at the satellite, from two matching streams of packets from two separate uplink sites, according to an embodiment.

FIG. 2 is a flow diagram illustrating a process for providing seamless protection switching of packets at the satellite, from two matching streams of packets from two separate uplink sites, according to an embodiment.

According to an embodiment, in block 200, the seamless protection switching of packets at the satellite is activated.

In block 205, at least two physically diverse (i.e., geographically separate) uplink facilities uplink identical streams of packets. According to an embodiment, the identical streams of packets uplinked by the two or more uplink facilities include identical packet headers in corresponding packets and any timestamp metadata within corresponding packets is also identical.

The identical streams of packets from at least two physically diverse uplink facilities may be received by a receiver on the telecommunications spacecraft 100. The receiver may include a single receive antenna configured to receive the identical streams of packets, according to an embodiment. Alternatively, the receiver may include multiple receive antennas, each configured to receive one or more streams of packets from one or more of the uplink facilities.

In block 210, an onboard analyzer on the satellite initiates a packet matching process based on the packet header information in a data packet received over one of the uplinks.

In block 215, the onboard analyzer determines whether or not a packet has arrived. If a packet has not arrived, the flow returns to block 210. If a packet has arrived, the flow proceeds to block 220.

In block 220, the onboard analyzer determines whether or not the received packet is error-free. According to an embodiment, the onboard analyzer may inspect the packet for any errors based on checksum and/or CRC information within the packet header. If the onboard analyzer determines that the received packet is not error-free, the flow proceeds to block 225. If the onboard analyzer determines that the received packet is error-free, the flow proceeds to block 230.

In block 225, in response to the onboard analyzer determining that the received packet is not error-free in block 220, the received packet is discarded and the error is logged.

In block 230, in response to the onboard analyzer determining that the received packet is error-free in block 220, the onboard analyzer determines whether a matching packet exists in a user-configurable output stream buffer. The onboard analyzer may use timestamp information, sequence numbering information, reference stamps, or any other information in the header or body of the received packet in determining whether a matching packet exists in the user-configurable output stream buffer.

If the onboard analyzer determines that a matching packet exists in the output stream buffer, the flow proceeds to block 235. If the onboard analyzer determines that a matching packet does not exist in the output stream buffer, then the flow proceeds to block 240.

In block 235, in response to the onboard analyzer determining that a matching packet exists in the output stream buffer in block 230, the received packet is discarded.

In block 240, in response to the onboard analyzer determining that a matching packet does not exist in the output stream buffer in block 230, the received packet is placed into the output stream buffer.

In block 245, the onboard analyzer determines whether or not the buffer is full. If the onboard analyzer determines that the buffer is not full, the flow returns to block 210, and the packet matching process continues. If the onboard analyzer determines that the buffer is full, the flow proceeds to block 250.

In block 250, in response to the onboard analyzer determining that the buffer is full in block 245, output packets are streamed out of the buffer toward the transmit antenna using a first in first out algorithm.

In block 255, the seamless output stream of packets is transmitted over the one or more transmit antennas of the telecommunications spacecraft to one or more receive sites or downlink sites. The receive sites or downlink sites then receive the seamless output stream from the satellite using the correct downlink parameters. According to an embodiment, the output stream is a lossless stream in which the missing or damaged packets have been eliminated as a result of the merge of the two or more uplinks received by the telecommunications satellite. According to another embodiment, the output stream has fewer missing or damaged packets than any of the two or more uplinks received by the telecommunications satellite as a result of the merge of the two or more uplinks.

Figure 3:
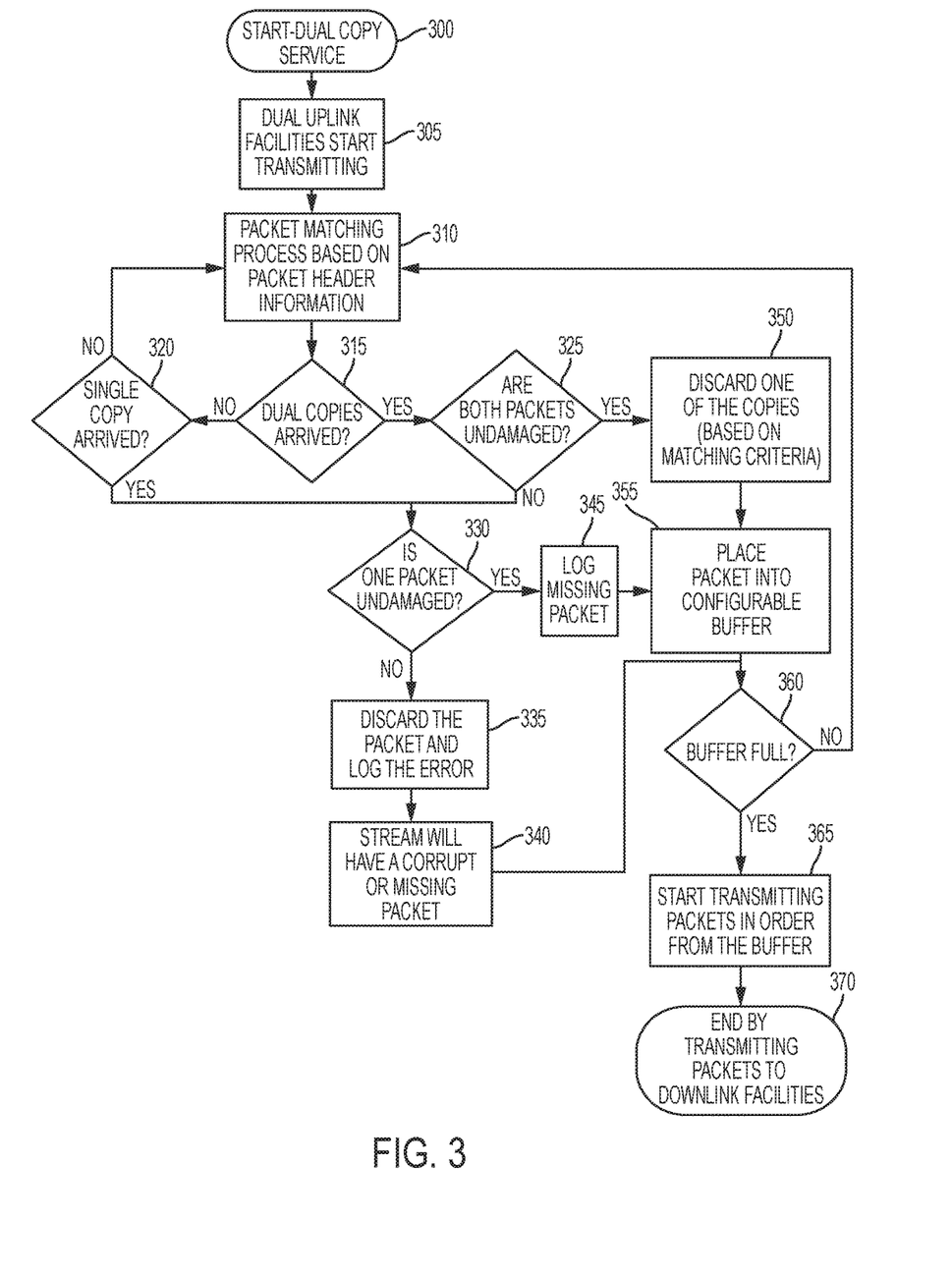
FIG. 3 is a flow diagram illustrating a process for providing seamless protection switching of packets at the satellite, from two matching streams of packets from two separate uplink sites, according to another embodiment.

FIG. 3 is a flow diagram illustrating a process for providing seamless protection switching of packets at the satellite, from two matching streams of packets from two separate uplink sites, according to another embodiment.

According to an embodiment, in block 300, the seamless protection switching of packets at the satellite ("dual copy service") is activated.

In block 305, two physically diverse (i.e., geographically separate) uplink facilities transmit identical streams of packets to the satellite. According to an embodiment, the identical streams of packets uplinked by the two or more uplink facilities include identical packet headers in corresponding packets and any timestamp metadata within corresponding packets is also identical. According to another embodiment, corresponding packets in the streams of packets uplinked by the two or more uplink facilities have matching reference or identification information stored in the packet header and/or packet body.

In block 310, an onboard analyzer on the satellite initiates a packet matching process based on the packet header information in a data packet received over one of the uplinks.

In block 315, the onboard analyzer determines whether or not at least two identical packets have arrived over the two or more uplinks based upon the packet headers and/or timestamp metadata. According to another embodiment, the onboard analyzer determines whether or not at least two corresponding packets having identical payloads have arrived over the two or more uplinks based upon reference or identification information stored in the packet header and/or packet body. If the onboard analyzer determines that at least two identical packets (or corresponding packets) have arrived, the flow proceeds to block 325. If the onboard analyzer determines that at least two identical packets (or corresponding packets) have not arrived, the flow proceeds to block 320.

In block 320, the onboard analyzer determines whether or not a single copy of a packet has arrived. If the onboard analyzer determines that a single copy of a packet has not arrived, the flow returns to block 310. If the onboard analyzer determines that a single copy of a packet has arrived, then the flow proceeds to block 330.

In block 325, in response to the onboard analyzer determining that at least two identical packets (or corresponding packets) have arrived in block 315, the onboard analyzer determines whether or not at least two identical packets (or corresponding packets) are undamaged. If at least two identical packets (or corresponding packets) are undamaged, the flow proceeds to block 350. Otherwise, the flow proceeds to block 330.

In block 330, in response to the onboard analyzer determining that at least two identical packets (or corresponding packets) are damaged, the onboard analyzer determines whether or not one of at least two identical packets (or corresponding packets) is undamaged. If the onboard analyzer determines that one of at least two identical packets (or corresponding packets) is undamaged, the flow proceeds to block 345. If the onboard analyzer determines that none of at least two identical packets (or corresponding packets) is undamaged, then the flow proceeds to block 335.

In block 335, in response to the onboard analyzer determining that none of at least two identical packets (or corresponding packets) is undamaged, the onboard analyzer discards the packets and logs the error. The flow proceeds to block 340, where the stream will have a corrupt or missing packet because no undamaged packet was received. The flow then proceeds to block 365.

In block 345, in response to the onboard analyzer determining that one of at least two identical packets (or corresponding packets) is undamaged in block 330, the missing packet is logged, and the flow proceeds to block 360.

In block 350, in response to the onboard analyzer determining that at least two identical packets (or corresponding packets) are undamaged, the onboard analyzer causes all but one of at least two identical packets (or corresponding packets) that are undamaged to be discarded. The flow then proceeds to block 360.

In block 355, the onboard analyzer causes the remaining undamaged packet is placed into a user-configurable output buffer.

In block 360, the onboard analyzer determines whether or not the output buffer is full. If the onboard analyzer determines that the output buffer is not full, the flow returns to block 310, and the packet matching process continues. If the onboard analyzer determines that the output buffer is full, the flow proceeds to block 365.

In block 365, the onboard analyzer causes the packets to be streamed from the output buffer to the transmit antenna. According to an embodiment, a FIFO algorithm may be used in streaming the packets from the output buffer to the transmit antenna.

In block 370, the satellite transmits the packets streamed from the output buffer over the transmit antenna to one or more downlink facilities.

Figure 4:
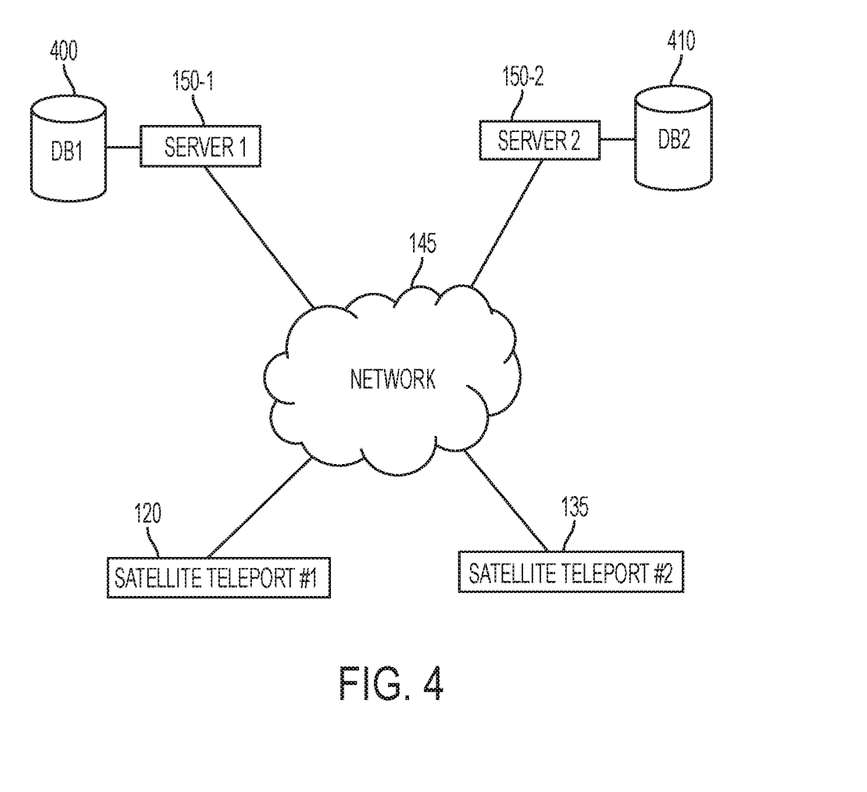
FIG. 4 is a block diagram that illustrates an embodiment of a network to which content providers, databases in communication with the content providers, and satellite teleports are connected, according to an embodiment.

FIG. 4 is a block diagram that illustrates an embodiment of a network 145 to which the content providers 150-1, 150-2, a first database 400 in communication with content provider 150-1, a second database 410 in communication with content provider 150-2, the first satellite teleport 120, and the second satellite teleport 135 are connected, according to an embodiment. The content providers 150-1, 150-2 communicate across a fiber transmission network, the Internet, or another wide area network (WAN) or local area network (LAN) 145 with the first satellite teleport 120 and the second satellite teleport 135. The first content provider 150-1 communicates with the first database 400, and the second content provider 150-2 communicates with the second database 410. The first satellite teleport 120 and the second satellite teleport 135 may interface with content providers 150-1, 150-2 and request content. Alternatively, the content providers 150-1 and 150-2 may push content to the first satellite teleport 120 and the second satellite teleport 135.

The first content provider 150-1 may communicate with or otherwise receive information or content from the first database 400 or another internal or external data source or database in the process of transmitting content to the first satellite teleport 120 and/or the second satellite teleport 135, and the second content provider 150-1 may communicate with the second database 410 or another internal or external data source or database in the process of transmitting content to the first satellite teleport 120 and/or the second satellite teleport 135.

Figure 5:
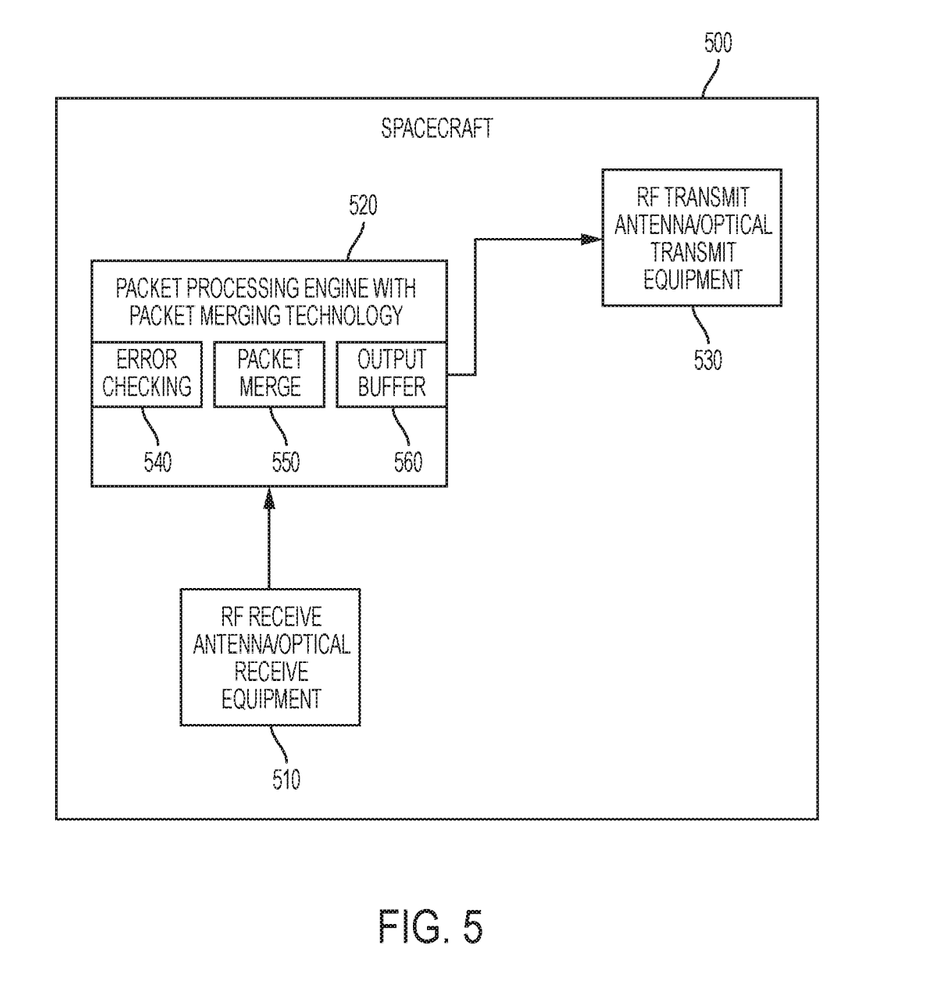
FIG. 5 is a block diagram illustrating a spacecraft configured to provide seamless protection switching of packets from two matching streams of packets from two separate uplink sites, according to an embodiment.

FIG. 5 is a block diagram illustrating a spacecraft 500 configured to provide seamless protection switching of packets from two matching streams of packets from two separate uplink sites, according to an embodiment.

The spacecraft 500 illustrated in FIG. 5 is an example of a telecommunications spacecraft 100 configured to provide seamless protection switching of packets from two matching streams of packets from two separate uplink sites. The spacecraft 500 may be a telecommunications satellite in any of various earth orbits, a space probe, a stationary space station, etc. The spacecraft 500 may include a receiver that receives the streams of packets from the uplink facilities including one or more RF receive antennas or optical receive equipment 510, a packet processing engine configured to perform packet merging 520, and an RF transmit antenna or optical transmit equipment 530. The packet processing engine 520 may include an error checking unit 540, a packet merge unit 550, and an output stream buffer 560.

According to an embodiment, the RF receive antenna or optical receive equipment 510 may be in communication with the packet processing engine configured to perform packet merging 520, and the packet processing engine configured to perform packet merging 520 may be in communication with the RF transmit antenna or optical transmit equipment 530.

Figure 6:
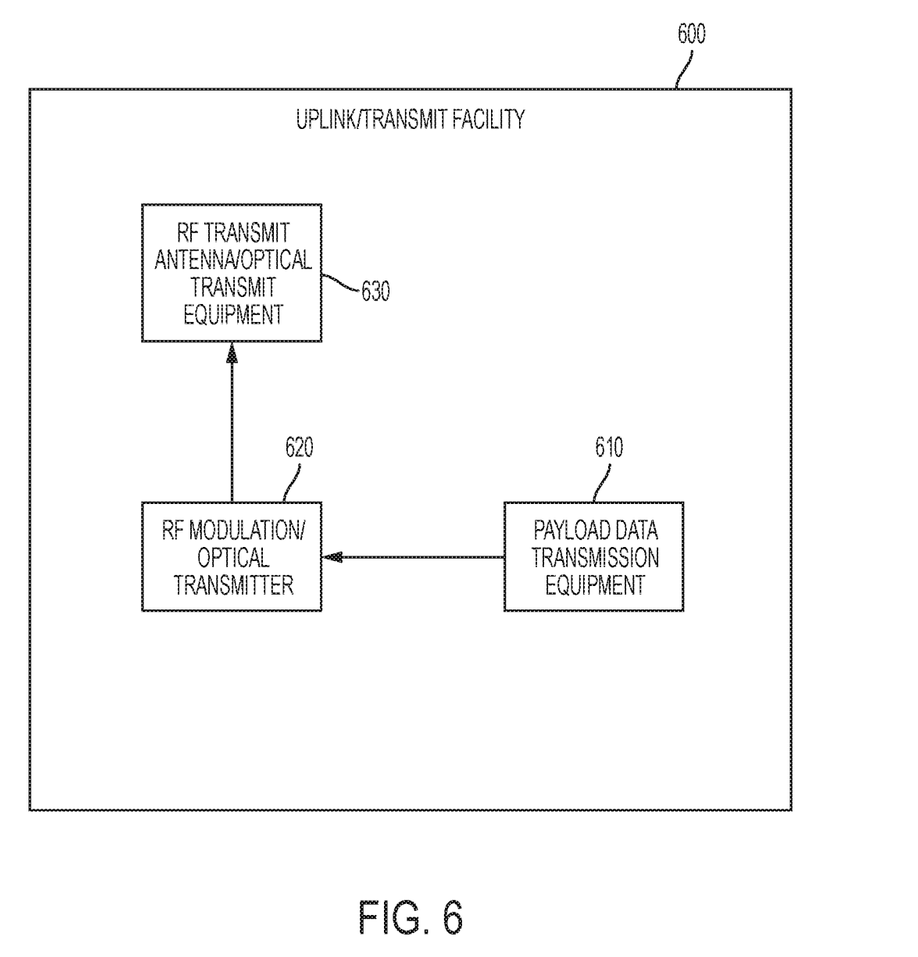
FIG. 6 is a block diagram illustrating an uplink/transmit facility configured to transmit a stream of packets to a spacecraft configured to provide seamless protection switching of packets, according to an embodiment.

FIG. 6 is a block diagram illustrating an uplink/transmit facility 600 configured to transmit a stream of packets to a spacecraft configured to provide seamless protection switching of packets, according to an embodiment.

The first satellite teleport 120 and the second satellite teleport 135 illustrated in FIG. 1 are examples of an uplink/transmit facility 600 illustrated in FIG. 6. According to an embodiment, the uplink/transmit facility 600 may include payload data transmission equipment 610, an RF modulation transmitter or optical transmitter 620, and an RF transmit antenna or optical transmit equipment 630.

The payload data transmission equipment 610 is in communication with the RF modulation transmitter or optical transmitter 620, and the RF modulation transmitter or optical transmitter 620 may be in communication with the RF transmit antenna or optical transmit equipment 630, according to an embodiment.

An embodiment may be implemented on a computer/server system. The computer/server system may include a processor and memory which operate to execute instructions, as known to one of skill in the art. The term "computer-readable storage medium" as used herein refers to any tangible medium, such as a disk or semiconductor memory, that participates in providing instructions to processor for execution. Additionally, the computer platform receives input from a plurality of input devices. The computer platform may additionally be connected to a removable storage device, such as a portable hard drive, optical media (CD or DVD), disk media, or any other tangible medium from which a computer can read executable code. The computer platform may further be connected to network resources which connect to the Internet or other components of a local public or private network. The network resources may provide instructions and data to the computer platform from a remote location on a network. The connections to the network resources may be via wireless protocols, such as the 802.11 standards, Bluetooth® or cellular protocols, or via physical transmission media, such as cables or fiber optics. The network resources may include storage devices for storing data and executable instructions at a location separate from the computer platform.

The foregoing detailed description has set forth various embodiments via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, or virtually any combination thereof, including software running on a general purpose computer or in the form of a specialized hardware.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A telecommunications satellite configured to:
receive a first stream of data packets transmitted by a first transmission site and a second stream of data packets transmitted by a second transmission site;
align the data packets in the first stream and the data packets in the second stream using matching timestamp information included in packet header information of the data packets of the first and second streams, analyze corresponding data packets in the first stream and the second stream to identify missing or corrupted data packets, and select data packets to place into forward transmission based upon the analysis; and
transmit the selected data packets to at least one receive site.

2. The telecommunications satellite according to claim 1, wherein the second stream of data packets is a duplicate of the first stream of data packets.

3. The telecommunications satellite according to claim 1, wherein the first transmission site and the second transmission site are geographically separated.

4. The telecommunications satellite according to claim 1, wherein at least one of the first transmission site and the second transmission site is a ground transmission location.

5. The telecommunications satellite according to claim 1, wherein at least one of the first transmission site and the second transmission site is another telecommunications satellite.

6. The telecommunications satellite according to claim 1, wherein the telecommunications satellite is configured to use matching reference stamps included in the first stream and the second stream in the aligning the data packets.

7. The telecommunications satellite according to claim 1, wherein the packet header information of the data packets of the first and second streams includes matching sequence numbering, and
wherein the telecommunications satellite is configured to use the matching sequence numbering to align the data packets in the first stream and the data packets in the second stream.

8. The telecommunications satellite according to claim 1, wherein telecommunications satellite is configured to use a packet merging technique on the data in the first and second streams to place into forward transmission, resulting in a lossless packet stream for forward transmission.

9. The telecommunications satellite according to claim 1, wherein the telecommunications satellite is configured to, in response to identifying a missing or corrupted data packet in the first stream, select a corresponding data packet from the second stream to place into forward transmission.

10. A telecommunications satellite configured to:
receive a first stream of data packets transmitted by a first transmission site and a second stream of data packets transmitted by a second transmission site, and to receive at least one additional stream of data packets transmitted by at least one additional transmission site;
align the data packets in the first stream and the data packets in the second stream based on packet header information of the data packets of the first and second streams, identify a data packet that is corrupt or missing in both the first stream and the second stream, and in response to identifying the data packet that is corrupt or missing in both the first stream and the second stream, select a corresponding data packet in one of the at least one additional stream of data packets to place into forward transmission; and
transmit the selected data packets to at least one receive site.

11. A method for packet merging at a satellite, the method comprising:
receiving, by a receiver on the satellite, a first stream of data packets transmitted from a first transmission site;
receiving, by the receiver on the satellite, a second stream of data packets transmitted from a second transmission site;
aligning the data packets in the first stream and the data packets in the second stream using matching timestamp information included in packet header information of the data packets of the first and second streams;
analyzing corresponding data packets in the first stream and the second stream to identify missing or corrupted data packets;
selecting data packets to place into forward transmission based upon the analysis; and
transmitting, by a transmitter on the satellite, the selected data packets to at least one receive site.

12. The method according to claim 11, wherein the second stream of data packets is a duplicate of the first stream of data packets.

13. The method according to claim 11, wherein the first transmission site and the second transmission site are geographically separated.

14. The method according to claim 11, wherein at least one of the first transmission site and the second transmission site is a ground transmission location.

15. The method according to claim 11, wherein at least one of the first transmission site and the second transmission site is another telecommunications satellite.

16. The method according to claim 11, wherein the aligning comprises using matching reference stamps included in the first stream and the second stream to align the data packets.

17. The method according to claim 11, wherein packet header information of the data packets in the first and second streams includes matching sequence numbering, and
wherein the data packets in the first and second streams are aligned using the matching sequence numbering.

18. The method according to claim 11, wherein the selecting comprises using a packet merging technique on the data in the first and second streams to place into forward transmission, resulting in a lossless packet stream for forward transmission.

19. The method according to claim 11, wherein the selecting comprises:
identifying a missing or corrupted data packet in the first stream of packets, and selecting a corresponding data packet from the second stream; or identifying a missing or corrupted data packet in the second stream of packets; and selecting a corresponding data packet from the first stream to place into forward transmission.

20. A method for packet merging at a satellite, the method comprising:

receiving, by a receiver on the satellite, a first stream of data packets transmitted from a first transmission site;

receiving, by the receiver on the satellite, a second stream of data packets transmitted from a second transmission site;

receiving, by the receiver on the satellite, at least one additional stream of data packets transmitted from at least one additional transmission site;

aligning the data packets in the first stream and the data packets in the second stream based on packet header information of the data packets of the first and second streams;

identifying a data packet that is corrupt or missing in both the first stream and the second stream;

in response to identifying a data packet that is corrupt or missing in both the first stream and the second stream, selecting a corresponding data packet in one of the at least one additional stream of data packets to place into forward transmission; and transmitting, by a transmitter on the satellite, the selected data packets to at least one receive site.

* * * * *